United States Patent [19]

Shinozaki et al.

[11] Patent Number: 4,664,830

[45] Date of Patent: May 12, 1987

[54] ELECTROLYTE FOR ELECTROLYTIC CAPACITOR

[75] Inventors: Fumihiko Shinozaki; Yutaka Yokoyama, both of Ome, Japan

[73] Assignee: Nippon Chemi-Con Corp., Tokyo, Japan

[21] Appl. No.: 886,987

[22] Filed: Jul. 16, 1986

[30] Foreign Application Priority Data

Jul. 17, 1985 [JP] Japan .................................. 60-155943
Aug. 17, 1985 [JP] Japan .................................. 60-180045

[51] Int. Cl.$^4$ ............................................ H01G 00/00
[52] U.S. Cl. .................................... 252/62.2; 546/13; 564/8
[58] Field of Search .................... 252/62.2; 546/13; 564/8

[56] References Cited

U.S. PATENT DOCUMENTS

| | | | |
|---|---|---|---|
| 3,052,829 | 9/1962 | Ross et al. | 252/62.2 |
| 3,118,939 | 1/1964 | Finkelstein | 252/62.2 |
| 3,293,506 | 12/1966 | Chesnot | 252/62.2 |
| 3,325,697 | 6/1967 | Ross | 252/62.2 |
| 3,539,881 | 11/1970 | Anderson | 252/62.2 |
| 4,117,531 | 9/1978 | Ross et al. | 252/62.2 |
| 4,189,761 | 2/1980 | Finkelstein | 252/62.2 |
| 4,221,851 | 9/1980 | Faust et al. | 252/62.2 |
| 4,242,722 | 12/1980 | Ross et al. | 252/62.2 |
| 4,399,489 | 8/1983 | Ross | 252/62.2 |
| 4,454,567 | 6/1984 | Ross et al. | 252/62.2 |

FOREIGN PATENT DOCUMENTS

| | | | |
|---|---|---|---|
| 1099091 | 4/1981 | Canada | 252/62.2 |
| 1126573 | 11/1984 | U.S.S.R. | 546/13 |

*Primary Examiner*—Arthur P. Demers
*Attorney, Agent, or Firm*—Kenyon & Kenyon

[57] ABSTRACT

An electrolyte for electrolytic capacitor containing within an aprotic solvent a tetrafluoroborate of an organic amine compound as solute.

An electrolyte for electrolytic capacitors according to the invention may conveniently be prepared by adding to an aqueous solution of tetrafluoroborate an equivalent amount of organic amine compound for reaction with subsequent reduction and dryness to obtain an anhydrous salt which as an approximately 10% by weight solution is then added to the aprotic solvent to prepare the resultant electrolyte.

8 Claims, No Drawings

ELECTROLYTE FOR ELECTROLYTIC CAPACITOR

FIELD OF THE INVENTION

This invention relates to an electrolyte for electrolytic capacitors containing within an aprotic solvent a tetrafluoroborate of an organic amine compound as solute.

BACKGROUND OF THE INVENTION

Hitherto, organic acids or their salts and glycol series pastes have been principally used as an electrolyte for electrolytic capacitor in the general purposes. The latest expansion of utilization for the electronic instruments requires more improvement and advancement in reliability and performance of the capacitor entailing the undesired problem of the presense of water in the paste and as a result an electrolyte using an aprotic solvent in place of organic acid and its salt and glycol paste has begun to receive attention.

The greatest subject of attention of the aprotic solvent system electrolyte is how to obtain an electrolyte of high conductivity and to achieve this by the use of an organic carboxylic acid or its salt which is well soluble in the aprotic solvent and has a high degree of disassociation has been the subject of much research which has not yet been successful. To solve the matter and obtain a high conductivity a solvent which produces water resulting from the reaction between acids and alcohols or glycols and even water is incorporated into the aprotic solvent, but with still insufficient conductivity, increments of water and solute contents with poor reliability at the elevated temperature as disclosed in the Japanese patent publications No. 55-3989, 57-56763, 58-32769 and the U.S. Pat. No. 4,117,531.

After extensive researches and studies concerned with obtaining an electrolyte which is a substantially nonaqueous system electrolyte and which has a high conductivity with use of an aprotic solvent but without using any solvent which forms water in reaction between acids and alcohols with glycols, it has been discovered that an organic amine salt of tetrafluoroborate has a high solubility in the aprotic solvent with an enhanced releasability and provides a high conductivity.

SUMMARY OF THE INVENTION

Thus, a principal object of the invention is to provide an electrolyte of substantially non water series high conductivity with use of the aprotic solvent.

An electrolyte for electrolytic capacitor according to the invention is characterized by a tetrafluoroborate of organic amine compound in the aprotic solvent as solute.

PREFERRED EMBODIMENTS OF THE INVENTION

The organic amine compounds according to the invention are preferably selected from the compound groups containing one or two pyridine rings as described hereinafter.

(1) Pyridine compounds in which one or more hydrogen atoms bonded to the pyridine carbon are replaced by an alkyl group, an alkenyl group having 1 to 15 carbons, an aryl group having 6 to 15 carbons or halogen: α-picoline, β-picoline, γ-picoline, 2-ethylpyridine, 3-ethylpyridine, 4-ethylpyridine, 2-n-propylpyridine, 2-iso-propylpyridine, 2-n-octylpyridine, 2-vinylpyridine, 2-hexene-2-pyridine, 2-geranylpyridine, 2,3-demethylpyridine, 2,6-dimethylpyridine, 3,4-dimethylpyridine, 3-ethyl-4-methylpyridine, 4-ethyl-2-methylpyridine, 6-ethyl-2-methylpyridine, 2,3,4-trimethylpyridine, 2,3,6-trimethylpyridine, 2,4,5-trimethylpyridine, 2,4,6-trimethylpyridine, 2-ethyl-3,5-dimethylpyridine, 2-phenylpyridine, 4-tolylpyridine, 4-mesitylpyridine, 3-chloropyridine, 3,5-dibromopyridine.

(2) Dipyridine compounds: 2,2-diethyl-4,4-dipyridine, 4,4-dimethyl-2,2-dipyridine.

(3) Compounds in which two pyridine rings are bonded by a alkylene group having 1 to 8 carbons or alkenylene group having 2 to 8 carbons:
1,3-di-(4-pyridine)-propane, 1,2-di-(4-pyridyl)-ethane 1,2-di-(4-pyridyl)-ethylene, 1,6-di-(4-pyridyl)-hexylene-3.

(4) Quatenary ammonium compounds in which to one nitrogen atom of pyridine are bonded an alkyl group, an alkenyl group having 1 to 15 carbons or an aryl group having 6 to 15 carbons: n-ethyl-2-bromopyridine, n-vinyl 3,5-dimethylpyridine, n-phenyl-4-ethylpyridine, n-tolyl-4-butylpyridine.

Further, the organic amine compound according to the invention may preferably be selected from primary, secondary, tertiary amines and quaternary ammonium compounds in which to the nitrogen atom are added a 1 to 4 carbon alkyl group, an alkenyl group having 1 to 15 carbons of an aryl group having 6 to 15 carbons and 1 to 3 hydrogen atoms.

(1) Primary amines: methylamine, ethylamine, propylamine, iso-propylamine, butylamine, amylamine, hexylamine, vinylamine, geranylamine, aniline, benzylamine.

(2) Secondary amines: dimethylamine, ethylamine, dipropylamine, diisopropylamine, divinylamine, digeranylamine, diphenylamine, ditolylamine, n-methyl.benzylamine.

(3) Tertiary amines: trimethylamine, triethylamine, tripropylamine, tributyl-amine, trivinylamine, trigeranylamine, triphenylamine, n-dimethyl.benzylamine.

(4) Quaternary ammonium compounds: tetramethylammonium, n-butylammonium, vinyl, trimethylammonium, phenylammonium, phenyltrimethyl, triethylammonium, benzyltrimethylammonium.

Moreover, the organic amine compound according to the invention may be preferably selected from tetrafluoroborate having a general formula,

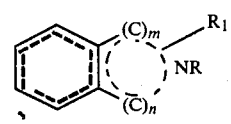

in which n is 0 to 1, m+n is 2 or 3, R1 is presence or nonpresence of alkyl substituent having 3 carbon atoms, R is a hydrogen or a N-heterocyclic-di-condensed ring compound in which a nitrogen atom forms a tertiary amine or a quaternary ammonium with one or two alkyl groups having 1 to 5 carbon atoms and 0 to 5 conjugated double bonds are contained in the ring:

A N-heterocyclic-di-condensed ring compound may be selected from quinoline, 2-methylquinoline(quinaldine), isoquinoline, and their partially hydrogenated compound or completely hydrogenated compounds and, as those compounds, n-alkylates, indole, 3-methylindole(skatol), isoindole, pseudoindole and their hydrogenated compound and, as those compounds, n-alkyl compounds.

The aprotic solvent to be used in the invention may be selected from the following but not limited thereto:

(1) Amide system solvent: n-methylformamide, n-dimethylformamide, n-ethylformamide, n-diethylformamide, n-methylacetoamide, n-dimethylacetoamide, n-ethylacetoamide, n-diethylacetoamide, hexamethylphosphorinamide (2) Oxide compounds: di-methylsulfoxide (3) Nitril compounds: acetonitril (4) Cyclic ester, cyclicamide: γ-butyrolactone, n-methyl-2-pyrolidone, ethylenecarbonate, propylenecarbonate.

(EXAMPLES 1 TO 12)

An electrolyte for the electrolytic capacitor according to the invention will be examplified in the following with 10% by weight solution for tetra-fluoroborates of various organic amine compounds with respect to the conductivity the fire voltage as shown in Table 1.

TABLE 1

| Example | Organic Amine Compounds | Aprotic Solvent | Conductivity (ms/cm) | Sparkling Voltage (V) |
|---|---|---|---|---|
| 1 | 2,6-dimethylpyridine | N—dimethylformamide | 22 | 40 |
| 2 | 4,4'-dimethyl-2,2'-dipyridyl | propylenecarbonate | 6.7 | 50 |
| 3 | 1,2-di-(4-pyridyl)-ethylene | N—ethylformamide | 14.7 | 60 |
| 4 | 4-tolylpyridine | N—dimethylacetoamide | 13.0 | 50 |
| 5 | N—ethyl-2-bromopyridine | N—methyl-2-pyrolidone | 10.2 | 50 |
| 6 | N—phenyl-4-ethylpyridine | dimethylsulfoxide | 12.2 | 50 |
| 7 | tributylamine | ethylenecarbonate | 6.9 | 60 |
| 8 | diphenylamine | hexamethylphosphorinamide | 6.9 | 40 |

TABLE 1-continued

| Example | Organic Amine Compounds | Aprotic Solvent | Conductivity (ms/cm) | Sparkling Voltage (V) |
|---|---|---|---|---|
| 9 | geranylamine $Me_2C=CH-CH_2-CH_2-C(Me)=CH-CH_2-NH_2$ | acetonitrile | 12.5 | 40 |
| 10 | n-butylammonium $[n\text{-}Bu\text{-}NH_3]^+$ | r-butyroloacton | 7.6 | 50 |
| 11 | vinyltrimethylammonium $[C=C-NMe_3]^+$ | N—methylacetoamide | 10.5 | 50 |
| 12 | phenyltrimethylammonium $[Ph-NMe_3]^+$ | N—methylformamide | 11.1 | 50 |
| Ref. | ethyleneglycol water ammonium adipate | 78% by weight 12% by weight 10% by weight | 6.7 | |

(N. B.) In formula Me is methyl, Et is ethyl, Bu is butyl.

Substantial results obtained at 25 V 1 micro F for electrolytes examplified in examples 1 to 12 are shown in Table 2.

TABLE 2

| | Initial Value | | | 110 deg. C. 1000 hours | | |
|---|---|---|---|---|---|---|
| Example | Capacity | tan δ (%) | Leakage Current (μA/min.) | Capacity | tan δ (%) | Leakage Current (μA/min.) |
| 1 | 1.08 | 0.013 | 0.38 | 1.01 | 0.045 | 0.03 |
| 2 | 1.03 | 0.052 | 0.22 | 1.02 | 0.066 | 0.04 |
| 3 | 1.07 | 0.023 | 0.25 | 1.05 | 0.028 | 0.04 |
| 4 | 1.07 | 0.026 | 0.27 | 1.03 | 0.033 | 0.06 |
| 5 | 1.06 | 0.033 | 0.34 | 1.04 | 0.034 | 0.05 |
| 6 | 1.07 | 0.027 | 0.30 | 1.03 | 0.031 | 0.04 |
| 7 | 1.02 | 0.054 | 0.29 | 1.01 | 0.060 | 0.03 |
| 8 | 1.03 | 0.053 | 0.35 | 1.02 | 0.062 | 0.03 |
| 9 | 1.07 | 0.026 | 0.33 | 1.02 | 0.040 | 0.05 |
| 10 | 1.05 | 0.047 | 0.30 | 1.01 | 0.051 | 0.02 |
| 11 | 1.06 | 0.033 | 0.28 | 1.03 | 0.035 | 0.03 |
| 12 | 1.06 | 0.031 | 0.31 | 1.04 | 0.033 | 0.05 |
| (Ref.) | 1.02 | 0.054 | 0.40 | 0.93 | 0.075 | 0.07 |

(EXAMPLES 13 TO 24)

An electrolyte for an electrolytic capacitor according to the invention will be exemplified in the following with 10% by weight solution for tetrafluoroborates of various N-hetrocyclic-di-condensed ring compound with respect to the conductivity as shown in Table 3.

Further, as comparative examples the conventional standard electrolytes composed of 78% by weight of ethylene glycol, 12% by weight of water and 10% by weight of ammonium adipirate as shown in Table 3.

TABLE 3

| Example | N—hetrocyclic-di-condensed ring Tetrafluoroborate | Aprotic Solvent | Conductivity (ms/cm) |
|---|---|---|---|
| 13 | quinoline tetrafluoroborate HBF$_4$ (quinoline structure) | N—dimethylformamide | 10.5 |
| 14 | quinaldine tetrafluoroborate | propylenecarbonate | 8.3 |

TABLE 3-continued

| Example | N—hetrocyclic-di-condensed ring Tetrafluoroborate | Aprotic Solvent | Conductivity (ms/cm) |
|---|---|---|---|
| | HBF$_4$ 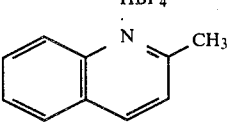 | | |
| 15 | 1,2,3,4-tetrahydroquinoline-tetrafluoroborate<br>HBF$_4$ 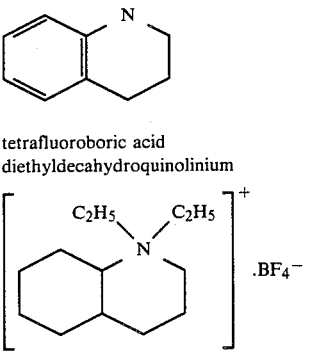 | N—ethylformamide | 11.1 |
| 16 | tetrafluoroboric acid diethyldecahydroquinolinium<br>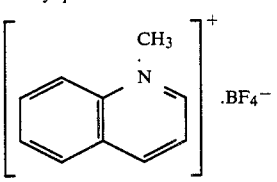 | N—dimethylacetoamide | 10.3 |
| 17 | tetrafluoroboric acid methylquinolinium<br>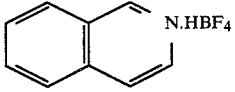 | N—methyl-2-pyrolidone | 12.0 |
| 18 | isoquinoline tetrafluoroborate<br>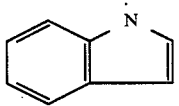 | r-butyrolactone | 10.0 |
| 19 | indole tetrafluoroborate<br>H.BF$_4$ 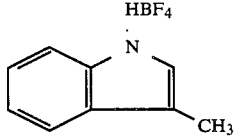 | ethylenecarbonate | 7.1 |
| 20 | skatol tetrafluoroborate<br>HBF$_4$ 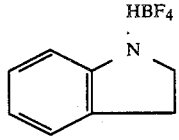 | hexamethylphosphorinamide | 7.0 |
| 21 | 2,3-dihydroindole tetrafluoroborate<br>HBF$_4$  | acetonitrile | 12.5 |
| 22 | tetrafluoroboric propylindolinium | dimethylsulfoxide | 8.3 |

TABLE 3-continued

| Example | N—hetrocyclic-di-condensed ring Tetrafluoroborate | Aprotic Solvent | Conductivity (ms/cm) |
|---|---|---|---|
| 23 | ![structure with C3H7, N, bf4-] isoindole tetrafluoroborate | N—methylacetoamide | 10.5 |
| 24 | ![structure N.H.BF4] pseudoindole tetrafluoroborate | N—methylformamide | 8.7 |
| Ref. | ![structure HBF4, N] ethyleneglycol 78% by weight water 12% by weight ammonium adipate 10% by weight | | 6.7 |

The life characteristics of electrolytes are examplified in Examples 13 to 24 and the comparative example are shown in Table 4.

TABLE 4

| | Initial Value | | | 110 deg. C. 1000 hours | | |
|---|---|---|---|---|---|---|
| Example | Capacity ($\mu$F) | tan $\delta$ (%) | Leakage Current ($\mu$A) | Capacity $\Delta$C (%) | tan $\delta$ (%) | Leakage Current ($\mu$A) |
| 13 | 22.5 | 0.031 | 0.22 | −1.3 | 0.041 | 0.08 |
| 14 | 22.5 | 0.033 | 0.23 | −1.6 | 0.035 | 0.07 |
| 15 | 22.6 | 0.031 | 0.25 | −0.1 | 0.038 | 0.08 |
| 16 | 22.6 | 0.032 | 0.23 | −0.7 | 0.034 | 0.10 |
| 17 | 22.8 | 0.029 | 0.27 | −0.5 | 0.032 | 0.07 |
| 18 | 22.8 | 0.031 | 0.21 | −0.4 | 0.038 | 0.06 |
| 19 | 22.4 | 0.035 | 0.23 | −1.2 | 0.040 | 0.10 |
| 20 | 22.4 | 0.035 | 0.24 | −1.5 | 0.042 | 0.12 |
| 21 | 22.8 | 0.029 | 0.28 | −3.4 | 0.040 | 0.15 |
| 22 | 22.3 | 0.034 | 0.23 | −1.1 | 0.038 | 0.09 |
| 23 | 22.7 | 0.031 | 0.25 | −0.3 | 0.035 | 0.07 |
| 24 | 22.5 | 0.033 | 0.26 | −0.2 | 0.035 | 0.07 |
| Ref. | 22.4 | 0.036 | 0.35 | −5.6 | 0.055 | 0.18 |

The electrolyte according to the invention may provide a non water series electrolyte having a high conductivity equivalent to or more than the conductivity of the conventional electrolyte composed of glycols, water and organic acid salt with improved and wide applicability in the design of an electrolytic capacitor.

What is claimed is:

1. An electrolyte for electrolytic capacitor containing within an aprotic solvent a tetrafluoroborate of an organic amine compound as solute.

2. An electrolyte for electrolytic capacitor according to claim 1, wherein said organic amine compound contains a compound containing one or two pyridine rings and primary, secondary, tertiary amines and quaternary ammonium compounds in which to a nitrogen atom is bonded 1 to 4 alkyl groups, alkenyl group or aryl group and 1 to 3 hydrogen atoms.

3. An electrolyte for electrolytic capacitor according to claim 2, wherein said compound containing one or two pyridine rings is a compound in which one or more hydrogen atoms bonded to the carbon of the pyridine ring are replaced by an alkyl group, an alkenyl group, aryl group or halogen.

4. An electrolyte for electrolytic capacitor according to claim 2 or 3, wherein said compound containing two pyridine rings includes a dipyridyl compound or a compound in which two pyridine rings are bonded by an alkylene group of 1 to 8 carbons or alkenylene group of 2 to 8 carbons.

5. An electrolyte for electrolytic capacitor according to claim 2 or 3, said electrolyte containing additionally a quaternary ammonium compound in which to a nitrogen atom of the pyridine ring are added one alkyl group, alkenyl group or aryl group.

6. An electrolyte for electrolytic capacitor according to claim 2 or 3, wherein the alkyl group and alkenyl group have 1 to 15 carbons and the aryl group has 6 to 16 carbons.

7. An electrolyte for the electrolytic capacitor according to claim 1, wherein said organic amine compound is a cómpound of general formula,

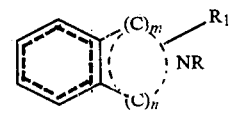

in which m is 0 to 1, m+n is 2 or 3, R1 is presence or nonpresence of an alkyl substituent having 3 carbon atoms, R is a hydrogen or a N-heterocyclic-di-condensed ring compound in which a nitrogen atom forms a tertiary amine or a quaternary ammonium with one or two alkyl groups having 1 to 5 carbon atoms and 0 to 5 conjugated double bonds are contained in the ring.

8. An electrolyte for electrolytic capacitor according to claim 1, wherein the non-protic solvent is selected from N-methylformamide, N-dimethylformamide, N-ethylformamide, N-diethylformamide, N-methylacetamide, N-dimethylacetamide, N-diethylacetamide, r-butyrolactone, N-methyl-2-pyrrolidone, ethylene carbonate, propylene carbonate, dimethyl sulfoxide, acetonitrile or a group of the mixture thereof.

* * * * *